Feb. 27, 1968
C. H. ANSINGH
3,370,501
NUT RECEIVING PIERCING SELF-TAPPING SCREW
Filed Oct. 22, 1965
2 Sheets-Sheet 1
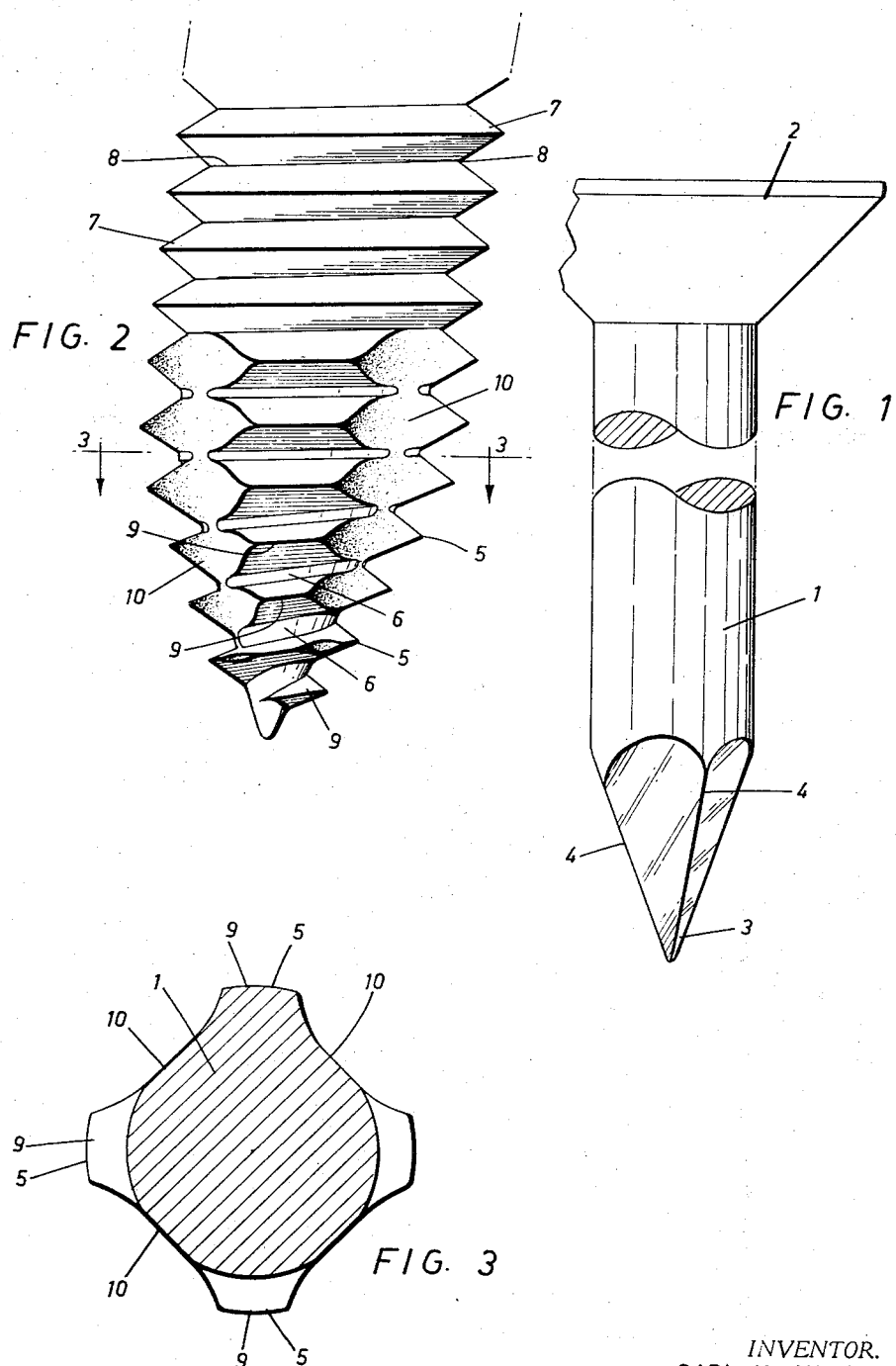
INVENTOR.
CARL H. ANSINGH
BY
Attorney Feb. 27, 1968   C. H. ANSINGH   3,370,501
NUT RECEIVING PIERCING SELF-TAPPING SCREW
Filed Oct. 22, 1965                                   2 Sheets-Sheet 2

INVENTOR.
CARL H. ANSINGH

BY Douglas S. John

Attorney

United States Patent Office 3,370,501
Patented Feb. 27, 1968

3,370,501
NUT RECEIVING PIERCING
SELF-TAPPING SCREW
Carl H. Ansingh, Milton, Ontario, Canada, assignor to P. L. Robertson Mfg. Co. Limited, Milton Ontario, Canada
Filed Oct. 22, 1965, Ser. No. 500,921
7 Claims. (Cl. 85—47)

ABSTRACT OF THE DISCLOSURE

A screw having a pointed portion, terminating in a sharp piercing point, the pointed portion having immediately adjacent the piercing point a continuous thread formation with the roots of the threads separated by lands and an interrupted thread portion above the continuous thread providing sharply crested cutting elements, the screw further having a shank portion having a thread formation running down to and smoothly merging into the spiral of the pointed portion thread formation and adapted to receive a nut passed over the pointed portion, the adjoining threads of the shank thread formation meeting in a common root line.

---

This invention relates to screws and more particularly to a novel screw adapted to receive a nut which will pierce and tap sheet metal of substantial thickness without damage to the nut engaging threads thereof whereby the screw can be readily driven through sheet metal members without requiring the predrilling or tapping thereof, and a nut may then easily be applied to secure the members in fixed relation.

One of the important objects of the invention is to provide a screw as aforesaid which will be extremely economical to produce. In this connection it is an object of the invention to provide a screw as aforesaid which may be produced from a blank in a single screw thread rolling operation in a conventional thread rolling machine.

Again, it is an object to provide a screw as aforesaid which will cut a complete and accurate thread through the sheet metal without predrilling or tapping of the sheet and without undue deformation of the sheet in the vicinity of the point of screw piercing. In this connection it is an object of the invention to provide such a functioning screw which may be readily threaded both out of the metal it has previously pierced and threaded and may be reused to pierce and thread a further metal sheet of substantial thickness.

According to the invention, the screw is provided with a shank of uniform diameter and a pointed portion with the pointed portion having formed thereon spaced threads with the roots of adjoining threads separated by distinct lands and the shank portion having formed thereon machine threads wherein adjoining threads have a common root line without a distinct land therebetween, the threads in the pointed and shank portions having the same pitch with the spiral configuration of the threads in the pointed portion forming a continuation of the spiral of the threads in the shank portion.

In the preferred embodiment of the invention the pointed portion of the screw is formed with a generally pyramidal configuration, for example a four sided pyramidal configuration, with at least certain of the threads in the pointed portion being interrupted between the pyramid corners whereby the threads at such corners form discrete cutting elements.

These and other objects and features will become apparent from the following detailed description taken in conjunction with the accompanying drawings in which:

FIGURE 1 is a perspective view of the preferred form of blank from which the screw of the present invention may be formed;

FIGURE 2 is an enlarged broken away part elevational part sectional view of the lower portion of the shank and the pointed portion of a screw formed from the blank of FIGURE 1 to embody the invention;

FIGURE 3 is a cross sectional view of the line 3—3 of FIGURE 2;

Figure 4:
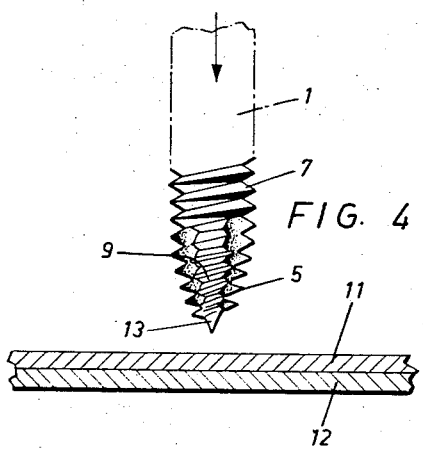
FIGURE 4 is a broken away part elevational part sectional view showing a screw embodying the invention about to be driven into a pair of sheet metal plates.
Figure 5:
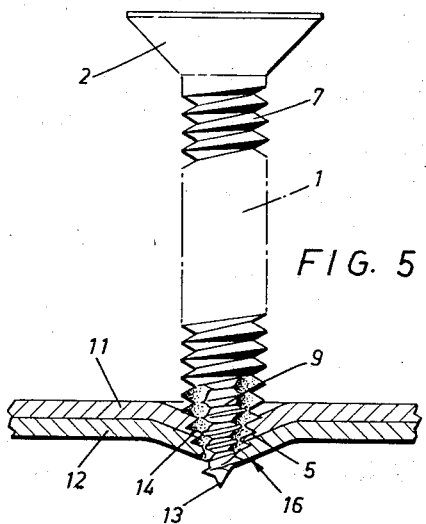
FIGURE 5 is a view similar to FIGURE 4 but showing the pointed portion of the screw having penetrated the sheet metal plates.
Figure 6:
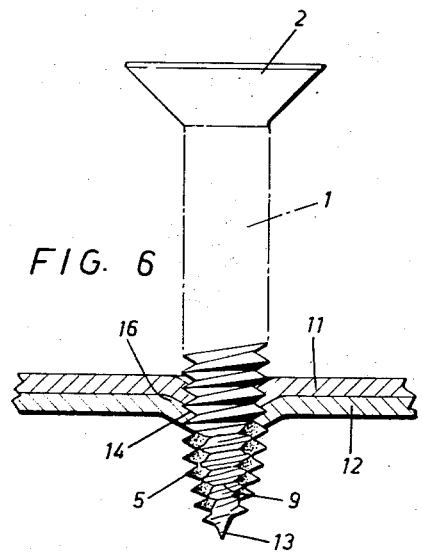
FIGURE 6 shows the screw of FIGURE 5 further advanced so that its lower shank portion has been threaded into the sheet metal plates.
Figure 7:
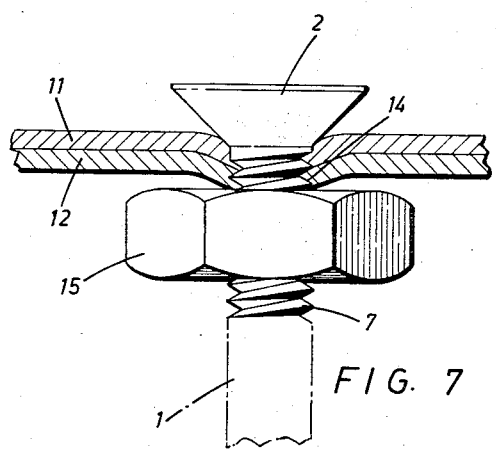
FIGURE 7 is a still further view of the view of FIGURES 4, 5 and 6 showing the screw completely threaded through the plates and having a nut applied thereto to clamp the plates together.

With reference to FIGURE 1 there is shown a screw blank comprising a shank portion 1, a head portion 2 and pointed portion 3, the pointed portion according to the preferred embodiment of the invention being of a generally pyramidal configuration. The blank shown has its pointed portion 3 in the form of a four-sided pyramid, that is of square cross-section, with four corners 4 although it will be appreciated that the pyramidal configuration may have various numbers of sides and in fact a reasonably satisfactory screw can be formed even when the pointed portion 3 of the blank is conical as will hereinafter appear.

The blank of FIGURE 1 is rolled to provide threads thereon, with the thread 5 in the pointed portion 3 being spaced by lands 6 and constituting what is known as sheet metal thread and the thread 7 in the shank portion 1 being formed as machine screw threads with adjoining threads being bevelled inwardly from their crests to a common root line 8.

As seen particularly in FIGURE 2 in the rolling of the spaced thread 5 on the pyramidal pointed portion 3 an uninterrupted thread spiral is formed only at the very tip of the point with the spiral making approximately one to two convolutions. Because of the angular or square cross-section of the pointed portion of the blank, the rolling operation in rolling the blank between the rolling dies provides discontinuities in the thread spiral and threads are formed only at the corners 4 of the blank except at the very tip of the pointed portion and these thread portions 9 form distinct cutting elements around the pointed portion of the screw. While these cutting elements are separated by substantially unthreaded or flat portions 10, they do, of course, lie on a spiral configuration being a continuation of the spiral of the complete thread spiral 5 at the very tip of the screw. The thread 5 including the cutting elements 9 forms a sheet metal tapping screw segment as hereinafter more fully described.

As the thread formation 5 approaches the shank portion of the screw, the lands 6 progressively become narrower until this thread formation merges smoothly into the machine thread formation 7 formed in the screw shank. It will be understood that the tapping thread formation 5, including the cutting elements 8, and the machine thread 7 will have the same pitch and that the maximum root and outer diameter of the thread formation 5 will be at most, no larger than the corresponding diameters of the machine screw thread 7 so that a nut can be applied to the screw to engage the machine screw thread 7 without interference from the threads 5. After the threads have been formed on the screw, the screw is then hardened by heat treatment in the conventional manner of ordinary tapping screws.

With reference to FIGURES 4 to 7, the screw is adapted to be driven for example, through sheet metal members 11 and 12 which have neither been pre-tapped or pre-drilled. As the screw is pressed against the sheet metal and driven in rotation the pointed screw tip 13 penetrates the metal surface and the thread 5 immediately at this tip catches and draws the screw into the metal surface while at the same time commencing the cutting of a thread form in the sheet metal. As the screw advances the cutting elements 9 acting as a tapping tool clear and enlarge an accurate thread 14 in the sheet metal so that by the time the pointed portion of the screw has penetrated through the sheet metal an accurate thread for cooperation with the machine thread of the shank portion of the screw has been formed.

As shown, a nut 15 may then be applied to engage the machine screw thread 7 of the shank of the screw and the plates 11 and 12 may be clamped together and the removal of the screw blocked by the nut 15.

In penetrating the sheet metal 11 and 12 it has been found that the screw enters quite readily without excessive axial force on the screw and with a minimum of inward deformation 16 of the metal around the punctured area. Moreover the thread 14, cut and formed in the sheet metal, is precise and accurate so that when the nut 15 is removed the screw may be threaded back out of the hole with a minimum of torque and may normally be removed by the fingers. The piercing and tapping of the metal can be accomplished with deformation of the threads 5 and 7 and if desired the screw may be used a multiple number of times for piercing and tapping further sheet metal plates.

Figure 8:
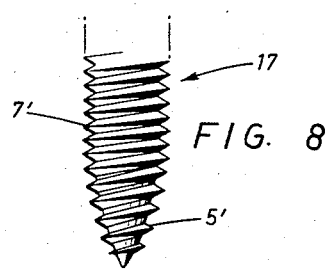
FIGURE 8 is a fragmented elevational view of a modified form of screw having thread formed thereon according to the invention.

FIGURE 8 illustrates a modified form of screw 17 formed by rolling a conical blank and again having a tapping thread formation 5' in the pointed portion merging smoothly into a machine thread formation 7' in the shank portion but without the spaced cutting or tapping elements 9. Again, of course, the threads 5' and 7' have the same pitch. This screw of FIGURE 8 is also adapted to penetrate and thread sheet metal and to allow a nut to be applied thereto after penetration but requires greater axial force to penetrate the metal resulting in greater deformation of the metal in the area of puncture and require much greater torque for removal. The screw 17 has, however, many useful applications particularly where the sheet metal is relatively thin or the increased metal deformation around the puncture area is of no consequence.

It will be understood that other variations and modifications may be made within the spirit of the invention and without departing from the scope of the appended claims.

What I claim is:

1. A screw comprising a shank portion of uniform diameter having at one end a head and at the opposite end a pointed portion terminating in a sharp piercing point, said pointed portion having a spiral thread formation thereon with the roots of adjoining threads being separated by lands of progressively decreasing width toward said head, said spiral thread formation comprising a thread portion immediately adjacent said piercing point which is continuous for at least one convolution and an interrupted thread portion above said continuous thread portion, said interrupted thread portion being sharply crested and said shank portion having a uniformed diameter spiral sharply crested thread formation thereon extending completely down to said pointed portion and adapted to receive a nut passed over said pointed portion with adjoining threads of said shank thread formation meeting in a common root line, the spiral of said shank portion thread formation running smoothly into the spiral of said pointed portion thread formation, and the diameter of the threads of said shank threaded portion being at least as great as and substantially equal to the largest thread diameter in said pointed portion thread formation.

2. A screw as claimed in claim 1 in which the threads of the thread formations of said shank and pointed portion have the same pitch.

3. A screw as claimed in claim 2 in which said pointed portion is generally of a pyramidal configuration.

4. A screw as claimed in claim 3 in which said pointed portion is generally of square cross-section.

5. A screw comprising a shank portion of uniform diameter having at one end a head, and at the opposite end a pointed portion of generally pyramidal configuration, terminating in a sharp piercing point, said pyramidal pointed portion having a thread formation thereon comprising a continuous spiral thread at the tip thereof with adjoining thread portions separated by flat spiral lands and having above the said tip and towards the shank spirally arranged thread portions at the corners of the pyramidal formation to present at such corners spirally arranged sharply crested cutting elements, said tip being substantially flat and unthreaded between said sharply crested cutting elements at said corners above said continuous spiral thread, and said shank portion having a uniform diameter thread formation thereon comprising a continuous sharply crested nut receiving spiral thread extending completely down to said pointed portion with adjoining threads meeting at a common root line, the spiral of the shank thread formation forming a continuation of the spiral of the thread formation of the pointed portion, and the diameter of the threads of said shank threaded portion being at least as great as and substantially equal to the largest thread diameter in said pointed portion thread formation.

6. A screw as claimed in claim 5 in which the thread formations in said shank portion and pointed portion have the same pitch.

7. A screw as claimed in claim 6 in which the lands between adjoining thread portions in said pointed portion progressively decrease towards said shank portion to provide a smooth blending of the pointed portion thread formation into the shank portion thread formation.

References Cited

UNITED STATES PATENTS

| | | | |
|---|---|---|---|
| 1,361,858 | 12/1920 | Hoeflich | 85—47 |
| 1,542,893 | 6/1925 | Kreutsberger | 10—141 |
| 2,293,930 | 8/1942 | Braendel | 85—47 |
| 2,455,885 | 12/1948 | Theurer | 85—47 |
| 3,083,609 | 4/1963 | Lorisek | 85—47 |
| 3,207,024 | 4/1965 | Sommer | 85—47 |
| 3,218,905 | 11/1965 | Reiland | 85—47 |
| 3,246,556 | 4/1966 | Phipard | 85—46 |

FOREIGN PATENTS 17,067  10/1889  Great Britain.

MARION PARSONS, JR., *Primary Examiner.*